W. F. PARKER.
Threading Screws.

No. 77,910.

Patented May 12, 1868.

Witnesses

Inventor
Wilbur F Parker
By his Attorney

United States Patent Office.

WILBUR F. PARKER, OF MERIDEN, CONNECTICUT.

Letters Patent No. 77,910, dated May 12, 1868.

---

IMPROVEMENT IN MACHINES FOR THREADING SCREWS.

---

The Schedule referred to in these Letters Patent and making part of the same.

---

TO ALL WHOM IT MAY CONCERN:

Be it known that I, WILBUR F. PARKER, of Meriden, in the county of New Haven, and State of Connecticut, have invented a new Improvement in Machines for Threading Screws; and I do hereby declare the following, when taken in connection with the accompanying drawings, and the letters of reference marked thereon, to be a full, clear, and exact description of the same, and which said drawings constitute part of this specification, and represent, in—

Figure 1:
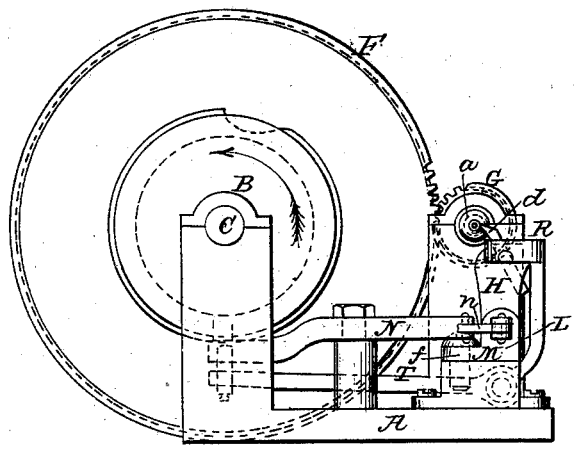
Figure 4:
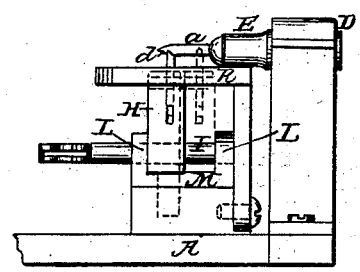
Figure 2:
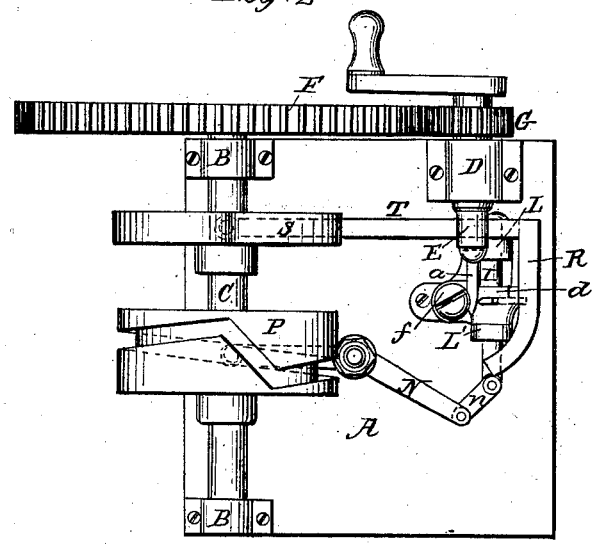
Figure 3:
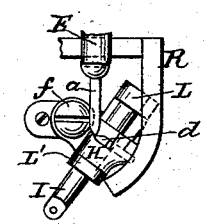

Figure 1, an end view from the left hand,
Figure 2 a top-view,
Figure 3 a detached view of the top of the tool-holder; and in
Figure 4 a front view.

This invention relates to an improvement in machines for threading the gimlet-point of wood-screws, the object being to cut the thread at right angles with the surface of the screw around the point, that is to say, so that the thread at the point will stand radially to the curvature upon which the point is reduced; and the invention consists in combining, with an apparatus which rigidly holds and revolves the screw upon its axis, a tool-holder and guide, which operates automatically, so as to accomplish the object of the invention.

In order to the clear understanding of my invention, I will proceed to fully describe the same, as illustrated in the accompanying drawings.

A is the bed-plate, supporting in bearings, B, the driving-shaft C; also in a bearing, D, a mandrel, E, which is caused to revolve with the shaft C by a gear or other connection, F and G, the said mandrel E being constructed in the usual manner, so as to firmly hold the screw-blank $a$ by its head. $d$ is the cutter, fixed in a tool-holder, H, the said tool-holder being hung rigidly to a shaft, I, the said shaft resting in bearings L, and so as to move axially therein, as also to partially revolve, so as to turn the cutter to or from the blank. The said bearings L are formed upon a plate, M, which said plate M is pivoted at $f$, so as to turn with the shaft I, as from the position in fig. 2, to that seen in fig. 3. The said shaft, with the tool-holder, may also be moved toward the head of the screw, as seen in red, fig. 4. To the shaft I, a lever, N, is attached, by a connection, $n$, as seen in figs. 1 and 2, and the said lever, operated by the cam P, on the shaft C, so that the said cam moves the shaft axially toward and from the head of the blank.

R is a guide, against which the tool-holder rests, as seen in figs. 2 and 3, and is curved toward the point of the screw, to correspond to the curve of the point of the screw, as seen in figs. 2 and 3; but back of the curve, and toward the head, the said guide is parallel with the axis of the screw, so that the tool-holder, resting against the guide, and drawn along its surface, guides the cutter conformably to the shape of the screw. The said guide is moved up to present the cutter or back, to relieve it by a cam, S, on the shaft C, through a lever, T.

This completes the construction of the machine. Its operation is as follows:

The blank being fixed in the mandrel, as before described and shown, the cam P is turned until the cutter is carried back, by the movement of the shaft I, to the proper position for the commencement of the thread, as denoted in red, fig. 4. At the same time the guide R is brought up so as to force the cutter on to the blank, then the revolution of shaft C draws the cutter along the blank, which at the same time revolves, until the cutter-holder strikes the bearing L', on the plate N, as denoted in fig. 2, which is at the point in the blank where the curvature of the point commences. From that point, the cam P continuing to operate, the cutter-holder is drawn still further on, but as it cannot move from the bearings L in consequence of the holder being hard against the bearing, it turns upon the pivot $f$, and, guided by the curved portion of the guide R, passes around the point as seen in fig. 3, so that it is at all times radial to the curvature of the point, and cuts the thread accordingly.

Having thus fully described my invention, what I claim as new and useful, and desire to secure by Letters Patent, is—

The combination of the mandrel, or its equivalent, for rotating the screw-blank and the guide R, with a chasing-tool and mechanism for imparting to the said tool a movement of translation along the body of the screw-blank, and curvilinearly along the curved or tapered extremity of the blank, substantially as described.

WILBUR F. PARKER.

Witnesses:
   A. J. TIBBITS,
   J. H. SHUMWAY.